(No Model.)

R. K. ORTT & M. A. SHEARER.
RAILWAY COACH VESTIBULE.

No. 505,324. Patented Sept. 19, 1893.

Witnesses:

Inventors
R. K. Ortt
M. A. Shearer
by V. D. Stockbridge & Son.
Attorneys.

UNITED STATES PATENT OFFICE.

ROWLEY K. ORTT AND MAHLON A. SHEARER, OF NORRISTOWN, PENNSYLVANIA.

RAILWAY-COACH VESTIBULE.

SPECIFICATION forming part of Letters Patent No. 505,324, dated September 19, 1893.

Application filed March 28, 1893. Serial No. 467,982. (No model.)

*To all whom it may concern:*

Be it known that we, ROWLEY K. ORTT and MAHLON A. SHEARER, citizens of the United States, residing in the borough of Norristown, county of Montgomery, and State of Pennsylvania, have invented a new and useful Improvement in Vestibules to be Attached to Passenger Railway-Coaches, of which the following is a specification, reference being had to the accompanying drawings, which form a part thereof.

Our invention relates to an improvement in a vestibule attached to passenger railway coaches, and the leading feature of it consists of three steel springs placed between two wooden frames formed in the shape of an arch, which after construction are held together by the covering, which may consist of water-proof cloth, rubber cloth or leather or any other material suitable for the purpose, and so adjusted as to allow the ends of the passenger coaches to admit of no dirt, dust, rain or wind and the springs being of sufficient elasticity to be readily adjustable to the motion of the coaches in turning curves, &c.

Figure 1:
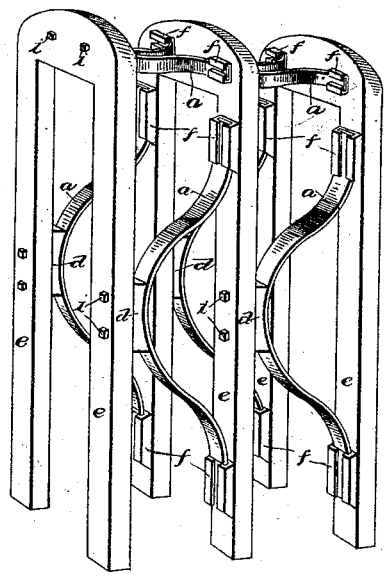
Figure 2:
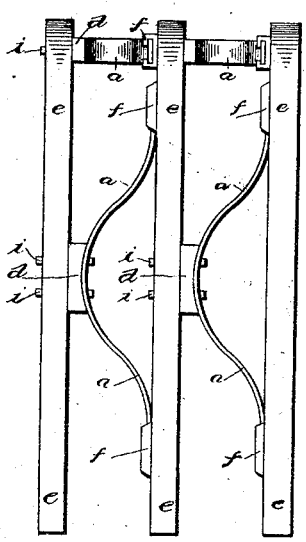

Figure 1. is a diagonal view showing our improvement, without the covering. Fig. 2. is a side view of the same, also without the covering.

The diagonal view in Fig. 1 shows the frame work forming an arch which is intended to be attached to a passenger coach over the extension which forms the passage way to the adjoining coach under which the coupler is placed.

"$e$" is the frame work which in the figures in the accompanying drawings consists of three frames, one of which is to be fastened to the coach and for convenience may consist of two or more frames.

"$a$" "$a$" "$a$" "$a$" "$a$" "$a$" are the flat steel springs formed in the shape of a bow fastened to the spring blocks "$d$" "$d$" "$d$" "$d$" by clamps or bolts "$i$." Each end of the bow shaped steel spring "$a$" rests in sockets or slip cups "$f$," which are attached to frame "$e$" and which readily allows the spring to work lengthwise, the steel spring "$a$" being retained in its position by the peculiar formation of the sockets or slip cups as shown in this figure, the socket or slip cup "$f$" to be constructed of sheet steel or other suitable material of shape shown in figure, the sides being turned up for the purpose of retaining steel spring "$a$" in its place. The steel spring "$a$" is made of flat spring steel curved in a bow shape, both ends of which are curved or turned in order to readily move in the socket or slip cup "$f$;" the steel spring "$a$" is to be constructed in such manner as to have sufficient elasticity to readily adapt itself to the motion of the coach in turning curves, &c., so that when attached to another coach with frame work of like description, covered as before indicated, will exclude dust, rain, wind, &c.

Fig. 2. is the side view of the frame work showing the steel springs "$a$" "$a$" "$a$" "$a$" and the manner in which the same are attached to spring block "$d$," which is fastened to frame work "$e$," and how the steel spring "$a$" is placed flat in the socket or slip cup "$f$."

Similar letters refer to similar parts throughout both views.

What we claim as our invention, and desire to secure by Letters Patent, is—

1. A vestibule for cars constructed of a series of supports separated by flat springs, substantially as described.

2. A vestibule for cars constructed of a series of supports, adapted to support the covering and provided with flat, bow-shaped, springs between the pairs of the supports, whereby elasticity sufficient to provide for the motion of a train is produced, substantially as described.

3. The combination of two or more supports for a vestibule for cars, of a flat spring separating the supports at the top and a pair of flat springs separating them at the sides, substantially as described.

ROWLEY K. ORTT.
MAHLON A. SHEARER.

Witnesses:
WM. A. EVANS,
ELLISTON M. DANIELS.